Patented Aug. 30, 1932

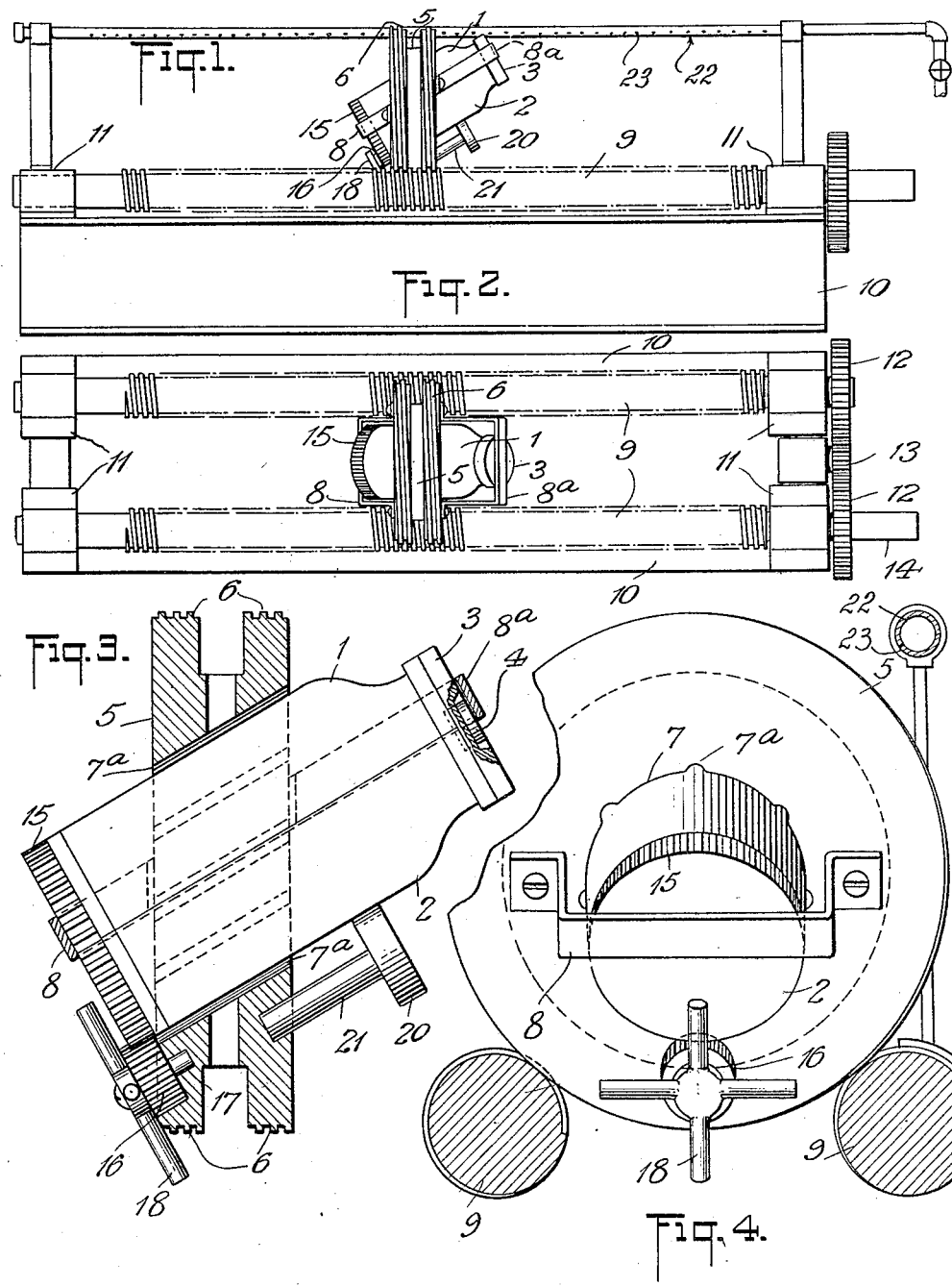

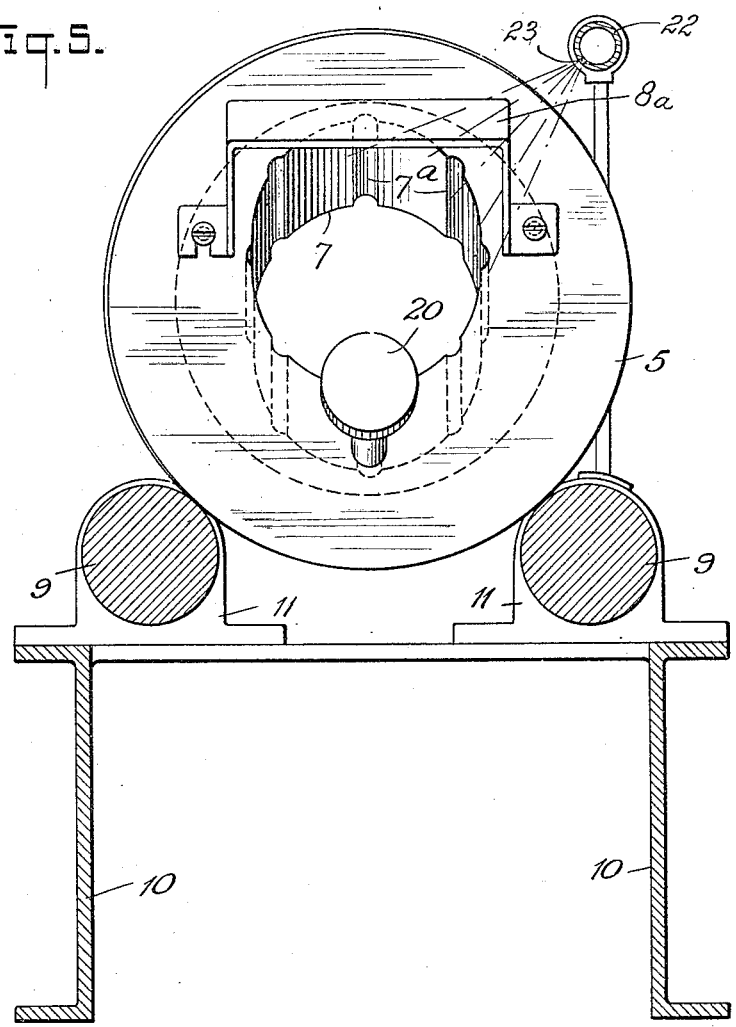
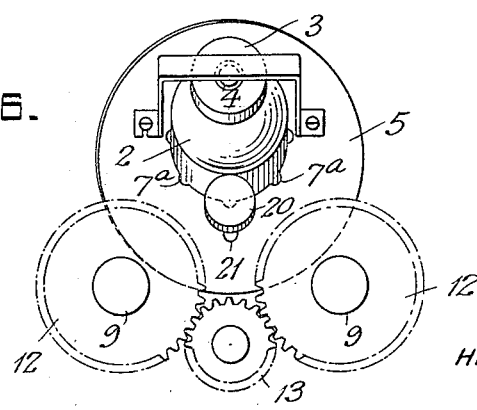

1,875,031

UNITED STATES PATENT OFFICE

HENRY B. LANDAU, OF FLUSHING, NEW YORK, ASSIGNOR TO GENERAL CHEMICAL COMPANY, OF NEW YORK, N. Y., A CORPORATION OF NEW YORK

MACHINE FOR MAKING WAX BOTTLES

Application filed November 10, 1928. Serial No. 318,394.

My invention relates to the manufacture of hollow elongated objects such as bottles and more particularly to casting or molding these objects from a plastic substance as for example, wax paraffin, ceresine and similar materials. In the manufacture of hollow elongated objects and particularly those of irregular shape like bottles, considerable difficulty has been experienced in producing a bottle of uniform wall thickness.

It is the purpose of my invention to provide a method and apparatus for producing such objects at a minimum cost and with uniform thickness of wall. It is also within the contemplation of my invention to produce such objects by a method which is simple but capable of quantity production. The term "hollow elongated objects" is used in a broad sense to include any non-spherical hollow object having one axis of greater length than any other axis.

Heretofore it has been customary to form such objects by partially filling a hollow mold with a plastic substance and shaking or rolling the mold around manually or by automatic machines until the plastic material formed a solid coating upon the inner surface of the mold. When manipulated by hand, uniform wall thickness was a very uncertain probability at best, and when accomplished by automatic machines, the devices for moving the mold became extremely complex in structure running the cost of manufacture and maintenance up to a prohibitive amount.

In accordance with my invention I cause the plastic material to flow evenly over the inner surface of a mold by imparting a slow and arcuate movement to the mold about two axes at an inclination to each other, one of the axes being substantially horizontal. As one way of imparting this motion to the mold I have devised a holder or carriage for the mold which supports the mold with its longitudinal axis at an inclination other than 90° to the horizontal. I also provide means for rotating the mold about its longitudinal axis and for simultaneously revolving the carriage about a substantially horizontal axis. The term "inclination" is used in its broad definition to denote the angle or difference in direction between two lines which do not necessarily intersect or between a line and the projection of a line upon a plane.

My method and apparatus will be described in greater detail in connection with the accompanying drawings in which Fig. 1 is a side elevation of a machine embodying my invention.

Fig. 2 is a plan of the same.

Fig. 3 is an enlarged section through the center of the mold carrier showing the mold therein.

Fig. 4 is a rear elevation showing the mold in position with certain parts omitted for the sake of clearness.

Fig. 5 is front end elevation with certain parts including the mold omitted, and Fig. 6 is an end elevation illustrating the mold in position and the driving gears.

The apparatus which I have illustrated to carry out my invention is adapted for use with a sectional mold having two separable sections 1 and 2, cap 3, and a tapered plug 4, the two sections and cap being secured together in any suitable manner. The complete mold is supported with its longitudinal axis at an inclination to the horizontal by a support or carriage 5 in the form of an annulus or relatively thick disc the peripheral edge of which is threaded as at 6. The carriage is provided with a central opening of a diameter substantially equal to that of the mold, the wall 7 of the opening being fluted as at 7a and inclined in order to support the mold when inserted therein at an inclination so that the longitudinal axis of the mold is never parallel to the axis of the carriage. A U shaped bracket 8 secured to one face of the carriage and extending around the bottom of the mold, serves to retain the mold from sliding through the carriage in one direction while a second U shaped bracket 8a secured to the other face of the carriage and extending around the upper end of the mold securely locks the mold in the carriage. Bracket 8a may be constructed to swing upon one leg, as shown, to facilitate the insertion of a mold in the support.

The carriage is supported with its axis in a substantially horizontal plane and rotated thereabout by means of two parallel spaced screw threaded shafts 9, horizontally supported by channel frames 10 carrying pillow blocks 11 at each end thereof constituting bearings for the shafts. At one end each shaft is provided with a spur gear 12 which engages an intermediate idler gear 13 in order that one shaft may be driven from the other. One shaft may be extended as at 14 and connected to any suitable prime mover (not shown). The two shafts are spaced apart a sufficient distance to permit the carriage to seat thereon with its threaded periphery in engagement with the threads of the shafts. Thus as the shafts are rotated by any suitable source (not shown) the carriage will be rotated about its axis which is substantially horizontal and will also be carried along the shafts in a horizontal direction which latter movement may be used as a measure of time if so desired.

To cause the mold to be rotated about its longitudinal axis the lower end thereof has gear teeth 15 formed thereon adapted to engage a spur gear 16 rotatably carried by a stud 17 set into one face of the carriage 5. Rigidly secured to the gear 16 is a spider 18 having four arms of sufficient length to contact with shafts 9 as the carriage is rotated thereby to impart a partial rotation to the mold at each revolution of the carriage. A roller 20 may be rotatably supported upon a stud 21 rigidly attached to the other face of the carriage and arranged to contact with the upper end of the mold to form a movable rest upon which the mold may bear.

In order to accelerate cooling of the mold and cause solidification of the wax or other material contained in the mold within the proper time (usually the time required for a carriage to travel the length of the shafts 9), a water spray pipe 22 is provided supported by brackets attached to the blocks 11. This water spray pipe is provided with perforations 23 positioned so that sprays of water will play upon the carriage and the mold carried thereby as it travels along the horizontal shafts 9, thus insuring satisfactory cooling of the mold and solidification of the contained wax.

The operation of my device is apparent from the foregoing and need only be summarized by pointing out that after the mold is filled with the proper amount of material and inserted in the carriage and the carriage placed upon the pair of parallel shafts, rotation of the two shafts in the same direction will cause the carriage resting therein and the mold to rotate about a substantially horizontal axis and to travel along the length of the shafts which may be so designed to give the proper time interval for the wax or other material to completely harden. During rotation of the carriage the arms of the spider will contact first with one shaft and then with the other thus giving the mold a partial rotation about its longitudinal axis for each rotation of the carriage. In this manner the entire inner surface of the mold is presented to the wax and coated thereby with a uniform thickness. If desired, one end of the two rotating shafts may be left unthreaded as shown in Figs. 1 and 2 to provide an idling space for the carriage should the operator fail to remove the carriage as it reaches the end of its travel.

While I have illustrated in the drawings but one carriage in position upon the parallel shafts 9, it is clear that a plurality of the carriages may be positioned upon the shafts at the same time if desired. Furthermore, it is clear that the shafts 9 and the periphery of the carriages need not necessarily be threaded, since the carriages will rotate merely from frictional contact with the shafts. As previously indicated, the primary purpose of threading the shafts and the periphery of the carriages is to provide for longitudinal movement of the carriages, which movement may be used as a measure of the time of cooling of the mold if so desired.

It is obvious that minor changes may be made in the details of construction without departing from the spirit and scope of my invention as defined in the appended claims.

I claim:

1. The method of producing hollow elongated objects which comprises charging an elongated mold with a molten material, permitting the mold to cool, while slowly simultaneously rotating the charged mold about its longitudinal axis and moving the mold about an axis at an inclination to the longitudinal axis of the mold, the inclination between the two axes being materially less than 90°.

2. The method of producing hollow elongated objects which comprises charging an elongated mold with a molten material, permitting the mold to cool, while slowly simultaneously rotating the charged mold about its longitudinal axis and about an axis at an inclination to the longitudinal axis of the mold, the inclination between the two axes being materially less than 90°.

3. The method of producing hollow elongated objects which comprises charging an elongated mold with a molten material, permitting the mold to cool, while slowly simultaneously moving the mold about a horizontal axis and about an axis inclined to the horizontal axis, the inclination between the two axes being materially less than 90°.

4. An apparatus for producing hollow elongated objects comprising an elongated mold, a rotary carriage, and a shaft engaging the periphery of said carriage to revolve the carriage about a substantially horizontal axis, said carriage having an aperture therethrough arranged and disposed to support the mold therein with its longitudinal axis at an inclination other than 90° to the axis upon which the carriage is rotated.

5. An apparatus for producing hollow elongated objects comprising an elongated mold, an annular rotary carriage therefor and a shaft engaging the periphery of said carriage to rotate the latter about a substantially horizontal axis.

6. In an apparatus for producing hollow elongated objects, the combination of an elongated mold with a carriage for supporting the mold, means for revolving the carriage about a substantially horizontal axis and means for rotating the mold about its longitudinal axis, the mold being supported in the carriage with its longitudinal axis at an inclination materially less than 90° from said horizontal axis.

7. In an apparatus for producing hollow elongated objects, the combination of an elongated mold with a carriage for rotatably supporting the mold with its longitudinal axis inclined other than 90° from the horizontal, means for revolving the carriage about a substantially horizontal axis, and means for intermittently rotating the mold within the carriage about its longitudinal axis.

8. An apparatus for producing hollow elongated objects comprising a hollow elongated mold, a rotary carriage therefor, a substantially horizontal shaft connected to said carriage to revolve the same about a horizontal axis, said carriage being constructed to support the mold with its longitudinal axis at an inclination materially less than 90° to the axis about which the carriage is rotated and means for rotating said mold about its longitudinal axis.

9. An apparatus for producing hollow elongated objects comprising an elongated mold, a rotary carriage, a shaft engaging the periphery of said carriage to revolve the carriage about a substantially horizontal axis, said carriage having an aperture therethrough arranged and disposed to support the mold therein with its longitudinal axis at an inclination other than 90° to the axis upon which the carriage is rotated, and means for rotating said mold within said carriage about its longitudinal axis.

10. An apparatus for producing hollow elongated objects comprising an elongated mold, an annular rotary carriage therefor having an external thread around its periphery, a threaded shaft engaging the periphery of said carriage to rotate the latter about a substantially horizontal axis, said carriage being constructed to support the mold with its longitudinal axis at an inclination other than 90° to the axis about which the carriage is rotated, and means for rotating said mold about its longitudinal axis.

11. An apparatus for producing hollow elongated objects comprising an elongated mold, an annular rotary carriage having threads upon its outer periphery, a pair of spaced substantially horizontal threaded shafts upon which said carriage is adapted to rest and to be rotated thereby about a horizontal axis, said carriage being constructed to support said mold with its longitudinal axis at an inclination other than 90° to the axis about which the carriage is rotated and means for rotating said mold about its longitudinal axis.

12. An apparatus for producing hollow elongated objects comprising an elongated mold, an annular carriage for supporting said mold and having threads around its periphery, a threaded shaft engaging said carriage to rotate the latter about a substantially horizontal axis, said carriage being constructed to support the mold with its longitudinal axis at an inclination other than 90° to the axis about which the carriage is rotated, and means for rotating said mold about its longitudinal axis, said latter means comprising teeth on said mold and a gear cooperating with said teeth and having arms extending therefrom constructed to contact with said shaft during rotation of said carriage to partially rotate said mold about its axis at every revolution of said carriage.

13. An apparatus for producing hollow elongated objects comprising an elongated mold, an annular rotary carriage therefor having an external thread around its periphery, a threaded shaft engaging the periphery of said carriage to rotate the latter about a substantially horizontal axis and to cause said carriage to travel along said shaft, said carriage being constructed to support the mold with its longitudinal axis at an inclination other than 90° to the axis about which the carriage is rotated, and means for rotating said mold about its longitudinal axis.

14. In an apparatus for producing hollow elongated objects, the combination of an elongated mold, a carriage for supporting the mold, means for rotating the carriage about a substantially horizontal axis, means for rotating the mold about its longitudinal axis, and means for moving the carriage along said horizontal axis, the mold being supported in the carriage with its longitudinal axis at an inclination other than 90° to the horizontal axis.

15. In an apparatus for producing hollow elongated objects, the combination of an elongated mold, a carriage for supporting the mold, means for rotating the carriage about a substantially horizontal axis, and means for moving the carriage along said axis, the mold being supported in the carriage so as to maintain its longitudinal axis at an inclination other than 90° to the horizontal axis.

In testimony whereof, I hereunto set my hand, this 1st day of November, 1928.

HENRY B. LANDAU.